Figure 1:
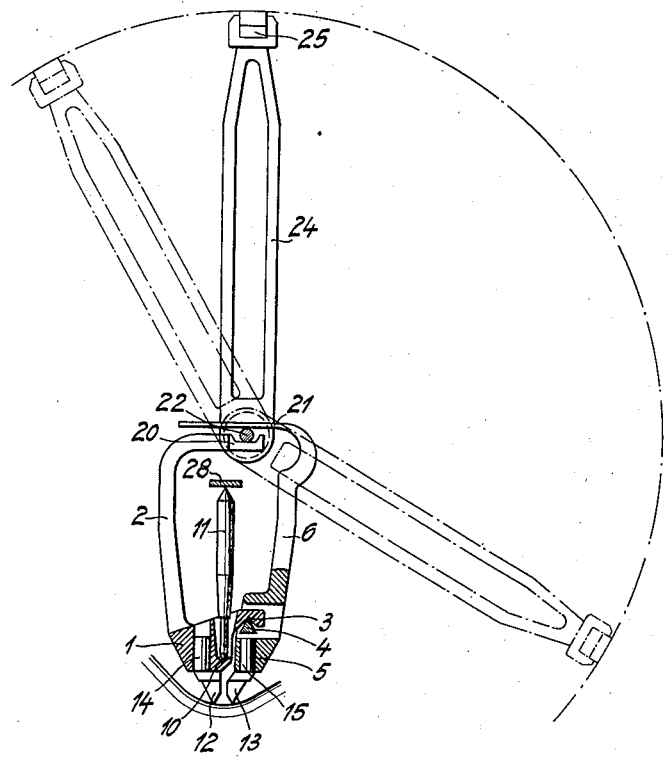

Sept. 29, 1942.  O. DIETRICH  2,297,394
INSTRUMENT FOR MEASURING ELONGATION
Filed Jan. 12, 1940

Inventor:
OTTO DIETRICH
by Edmund H. Parry jr.
Attorney

Patented Sept. 29, 1942

2,297,394

UNITED STATES PATENT OFFICE 2,297,394

INSTRUMENT FOR MEASURING ELONGATION

Otto Dietrich, Friedrichshafen, Bodensee, Germany; vested in the Alien Property Custodian Application January 12, 1940, Serial No. 313,619
In Germany January 14, 1939

4 Claims. (Cl. 33—148)

My invention relates to instruments for measuring elongation and has special reference to instruments of this kind which are used for determining stresses on the surface of constructional parts more particularly on places not easily accessible and for small measuring distances.

It is known for such purposes to make use of instruments having two measuring feet provided with points adapted to be pressed on to the surface to be tested, these feet bearing one against the other at lower points thereof, so that their upper ends due to the lever proportion indicate the elongation of the test piece under stress on an enlarged scale. It has been proposed to provide a micro scale on the top end of one foot and to have a pointer or a thread on the other moving over the scale and to use a microscope for reading the scale.

Instruments of this kind are most important for determining elongation of surfaces in the inner portions of structural elements for engines, motors and the like, such as pushing rods, bearings, narrowly curved surfaces of crank shafts and others. As the measuring length on such surfaces can be only comparatively small, it is necessary that the ratio of indication be very great. In the above mentioned cases it proved that the existing instruments are not fit to answer the purpose. It became necessary to invent and design a new instrument capable of being used inside of very narrow curvatures which allow for a short measuring base only; at the same time the indicating scale and the lever arrangement leading thereto should be such that an extraordinary degree of exactness is reached. The transmission ratio must be as great as possible and at the same time there should be no increase in the height dimension.

All these demands are solved by my invention according to which the upper ends of the two measuring feet each are provided with a plane portion, said portions being substantially parallel and situated oppositely to each other in such manner that a roller may be interposed adapted to make rolling movements in dependence on the movement of the upper levers arms of the measuring feet relative to each other. An indicating arm is radially fixed to the roller and a microscale is provided on which said indicating arm indicates the elongation of the measuring base under stress. This scale is looked at by means of a microscope.

Thus, a double mechanical transmission is created from the touching points of the lower part of the measuring feet to the microscale, whereby it becomes possible to have an enlargement of the elongation of the test base which may reach the ratio of 1 to 30,000 or even to 50,000 and yet the entire instrument need not be higher than those known before and having a much smaller transmission ratio.

Instruments according to my invention can easily be built so as to want very little room and can be adapted to fit into any narrow space not easily accessible such as curvatures of pistons, piston rods and the like of motors. Because of the extremely short measuring base of a few millimeters only and by means of the extraordinary double ratio of enlargement of the elongation on the scale it is possible to measure elongations at places hitherto not accessible to such examination.

I prefer to provide resilient means for one or both planes between which the roller is interposed at the top of the measuring feet and also a flat bearing for said roller, so as to have always good touching connection between the roller and the planes. Such resilient or elastic means may at the same time serve for holding together the two measuring feet so that a special spring or the like for such purpose may be saved.

It is also advantageous to arrange the bearing for the roller substantially vertically above the point in which the two measuring feet support each other, thus ensuring that no special forces in the measuring direction are created by the resilient or elastic planes; such forces might injure the exactness of the measurement.

Furthermore the lower measuring points may be shifted in relation to their upper journalling points so as to be closer together and to have a very small measuring base for extremely curved surfaces.

The pressing rod for pressing the instrument on to the surface to be examined should be so short that its upper end does not reach to the parallel planes and the lower end of the rod should act on the instrument at a place preferably lower than the point in which both measuring feet support each other. A resilient plate or spring presses on the pressing rod and this is situated below the two parallel planes so that the pointer attached to the roller and the arm for the scale are free to move above the planes. Thereby it becomes possible to provide a special modification of my invention which consists in having the scale and pointer arrangement made tiltable in relation to the measuring feet. Thus, this portion of the instrument may be tilted in any desired direction. This means that the instrument according to my invention may be inserted and used in still narrower places than before because of the possibility of tilting its upper scale transmission into any desired direction.

Having given a general specification of my invention I now want to point it out more in detail, having reference to the drawing which represents two examples embodying my invention.

Figure 2:
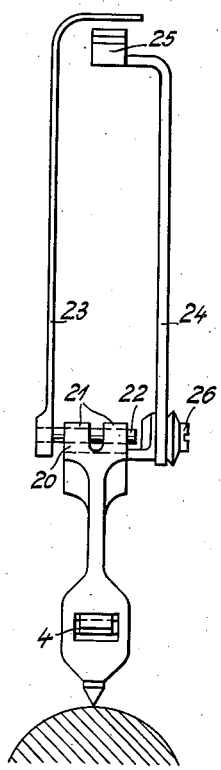
Figure 3:
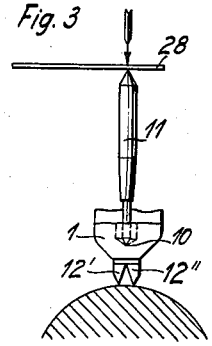

Fig. 1 is a side elevation partly in section and Fig. 2 is another side elevation, seen at right angles to Fig. 1. In Fig. 3 a modification of one measuring foot is shown in side elevation corresponding to Fig. 2 of the first example.

There are two measuring feet 2 and 6, respectively. The lower portion 1 of foot 2 is provided with a bearing 3 for edge 4 belonging to the lower portion 5 of foot 6. At 10 pressing rod 11 acts on foot 2 and thus presses the two measuring points 12 and 13, which are inserted into the measuring feet 2 and 6 at 14 and 15, respectively, on to the surface to be examined. The pressure on rod 11 is exerted by means of a resilient plate or spring 28.

The upper end of foot 2 is provided with a plane bearing 20, and the upper end of foot 6 is shaped into a plane spring portion 21. Roller 22 is inserted between both planes and fixed to this roller is the pointer 23. There is an arm 24 attached to foot 2 by means of screw 26. This arm is provided with a micro-scale 25 over which the pointer 23 is adapted to move for indicating the elongation occurring when the surface onto which the instrument is pressed undergoes certain stresses.

The upper portion consisting of arm 24 with scale 25 and pointer 23 is tiltable as indicated in dotted lines; for tilting it is only necessary to loosen screw 26.

In Fig. 3 it is indicated that in special cases it may be advisable to provide a narrow double point 12', 12" on one of the measuring feet.

I do not want to be limited to the details described or shown in the drawing as many variations may occur to those skilled in the art without deviating from the scope of my invention.

What I claim is:

1. An instrument for measuring elongation of the surface of structural parts comprising two members having contact means for engaging a surface at one end, said contact means being closely spaced together, coacting fulcrum means on each member near the contact means pivoting the members together, spaced opposed parallel portions carried by the other ends of the members, a roller engaged between the parallel portions for rotation by relative movement thereof, an index pointer carried by the roller, a scale cooperating with the index pointer, and a scale arm supporting said scale rotatably mounted on one of said members substantially coaxially with said roller.

2. An instrument for measuring elongation of the surface of structural parts comprising two members having contact means for engaging a surface at one end, coacting fulcrum means on each member intermediate its length for pivoting the members together, spaced opposed parallel portions carried by the other ends of the members, a roller engaged between the parallel portions for rotation by relative movement thereof, an arm carried by the roller, a second arm rotatably mounted on one of said members substantially coaxially with said roller, and a scale carried by one of said arms cooperating with the other arm for reading the relative displacement of the two arms.

3. An instrument for measuring elongation of the surface of structural parts comprising two members having contact means for engaging a surface at one end, coacting fulcrum means on each member near said contact means for pivoting the members together, means for receiving a loading element on one of said members intermediate the contact means and the fulcrum means, spaced opposed parallel portions carried by the other ends of the members, a roller engaged between the parallel portions for rotation by relative movement thereof, an arm carried by the roller, a second arm rotatably mounted on one of said members substantially coaxially with said roller, and a scale carried by one of said arms cooperating with the other arm for reading the relative displacement of the two arms.

4. In an instrument for measuring elongation of the surface of a structural part, means engageable with the structural part responsive to dimensional variations thereof, a relatively long index arm responsive to said means and adjustably mounted for rotation thereon to be set in a desired position relative to said means for observation in restricted positions, said arm being also rotatable substantially on the same axis from the set position in dependency on the dimensional variation of the structural part, and a second arm adjustably mounted for rotation on said means substantially coaxially with the first arm to be fixed in the desired position relative to the first arm, and a scale carried by one of the arms cooperating with the other arm for reading the relative displacement of the two arms.

OTTO DIETRICH.